US011386720B2

(12) United States Patent
Takahashi et al.

(10) Patent No.: US 11,386,720 B2
(45) Date of Patent: Jul. 12, 2022

(54) VEHICLE CONTROL DEVICE, VEHICLE CONTROL METHOD, AND VEHICLE CONTROL PROGRAM

(71) Applicant: HONDA MOTOR CO., LTD., Tokyo (JP)

(72) Inventors: Kazuyuki Takahashi, Wako (JP); Atsushi Ishioka, Wako (JP); Akihiko Otsu, Wako (JP); Akira Mizutani, Wako (JP); Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 520 days.

(21) Appl. No.: 16/481,933

(22) PCT Filed: Feb. 3, 2017

(86) PCT No.: PCT/JP2017/003914
§ 371 (c)(1),
(2) Date: Jul. 30, 2019

(87) PCT Pub. No.: WO2018/142563
PCT Pub. Date: Aug. 9, 2018

(65) Prior Publication Data
US 2020/0043247 A1 Feb. 6, 2020

(51) Int. Cl.
*G07B 15/00* (2011.01)
*B60W 40/02* (2006.01)
(Continued)

(52) U.S. Cl.
CPC .............. *G07B 15/00* (2013.01); *B60W 30/12* (2013.01); *B60W 40/02* (2013.01); *G08G 1/09* (2013.01)

(58) Field of Classification Search
CPC ....... G07B 15/00; B60W 30/12; B60W 40/02; G08G 1/09
See application file for complete search history.

(56) References Cited

U.S. PATENT DOCUMENTS 8,060,303 B2 * 11/2011 Bando .............. G08G 1/096791
701/410
2001/0023380 A1 9/2001 Mizutani
(Continued)

FOREIGN PATENT DOCUMENTS

CN 1250198 4/2000
CN 1682248 10/2005
(Continued)

OTHER PUBLICATIONS

Chinese Office Action for Chinese Patent Application No. 201780084528.3 dated Dec. 16, 2021.
(Continued)

*Primary Examiner* — Kira Nguyen
(74) *Attorney, Agent, or Firm* — Amin, Turocy & Watson, LLP

(57) ABSTRACT

A vehicle control device includes a mounting unit on which a medium storing authentication information for passing through a toll road is mountable, a detector which is configured to detect a state where the medium is mounted on the mounting unit or a state where the medium is not mounted on the mounting unit, and an automated driving controller which is configured to perform automated driving and change control details of the automated driving on the basis of detection results obtained by the detector, wherein the automated driving controller configured to determine whether to change a target gate or not on the basis of a relationship between a time when the mounting state detected by the detector is changed and a time when the vehicle is expected to arrive at the target gate or a relationship between a position of the vehicle at the time when the mounting state detected by the detector is changed and a position of the target gate.

7 Claims, 10 Drawing Sheets

(51) Int. Cl.
  *G08G 1/09* (2006.01)
  *B60W 30/12* (2020.01)

(56) References Cited

U.S. PATENT DOCUMENTS

| | | | | |
|---|---|---|---|---|
| 2004/0046019 | A1* | 3/2004 | Kojima | G07B 15/063 235/384 |
| 2005/0267679 | A1* | 12/2005 | Tajima | G07B 15/063 701/410 |
| 2007/0093104 | A1* | 4/2007 | Mouri | G07B 15/00 439/188 |
| 2013/0096794 | A1 | 4/2013 | Febrer et al. | |
| 2016/0379493 | A1* | 12/2016 | Bhuiya | H04W 4/40 701/117 |
| 2017/0232967 | A1* | 8/2017 | Tomatsu | G05D 1/0212 701/117 |

FOREIGN PATENT DOCUMENTS

| | | |
|---|---|---|
| CN | 101794464 | 8/2010 |
| CN | 103339010 | 10/2013 |
| CN | 104627177 | 5/2015 |
| CN | 104627181 | 5/2015 |
| CN | 104684777 | 6/2015 |
| EP | 2863177 | 4/2015 |
| JP | 2001-255937 | 9/2001 |
| JP | 2003-294473 | 10/2003 |
| JP | 2005-115531 | 4/2005 |
| JP | 2008-083816 | 4/2008 |
| JP | 2009-116623 | 5/2009 |
| JP | 2010-139365 | 6/2010 |
| JP | 2011-183865 | 9/2011 |
| JP | 2012-066630 | 4/2012 |
| KR | 10-2012-0075856 | 7/2012 |
| WO | 2013/031990 | 3/2013 |
| WO | 2015/166721 | 11/2015 |
| WO | 2016/189649 | 12/2016 |

OTHER PUBLICATIONS

Hui, et al. Application of IoT Technology in Intelligent Transportation, Jiangxi Communication Science & Technology, 20151215, pp. 42-45.
International Search Report and Written Opinion for International Application No. PCT/JP2017/003914 dated May 9, 2017, 9 pgs.
Japanese Office Action for Japanese Patent Application No. 2018-565188 dated Jan. 14, 2020.

* cited by examiner

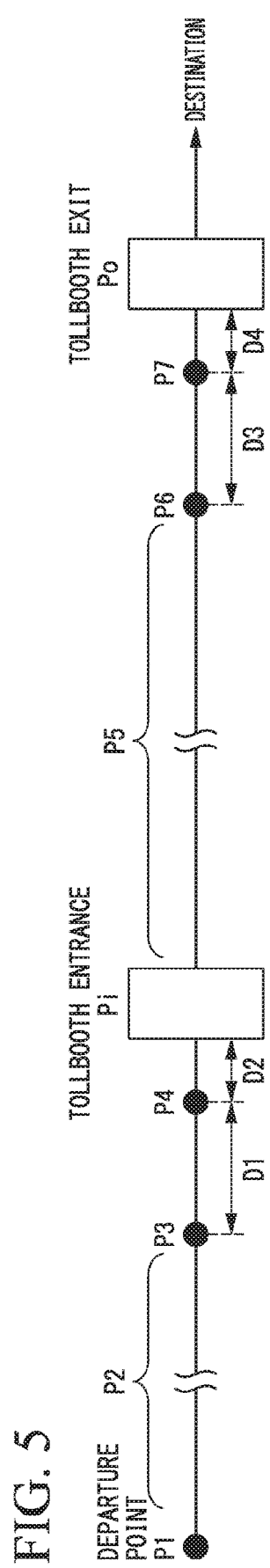

FIG. 6

| POINT | STATE OF VEHICLE | NON-MOUNTING→MOUNTING | MOUNTING→NON-MOUNTING |
|---|---|---|---|
| P1 | BEFORE DEPARTURE | (C1) CHANGE OF TARGET GATE FROM GENERAL GATE TO ETC GATE | (C8) CHANGE TARGET GATE FROM ETC GATE TO GENERAL GATE |
| P2 | TRAVELING ON GENERAL ROAD | (C2) CHANGE OF TARGET GATE FROM GENERAL GATE TO ETC GATE | (C9) CHANGE TARGET GATE FROM ETC GATE TO GENERAL GATE |
| P3 | VICINITY OF TOLLBOOTH ENTRANCE | (C3) CHANGE OF TARGET GATE AND TRAVELING LANE | (C10) CHANGE TARGET GATE AND TRAVELING LANE |
| P4 | RIGHT BEFORE TOLLBOOTH ENTRANCE | (C4) STOP AT GENERAL GATE AND GIVE NOTIFICATION | (C11) STOP AT ETC GATE AND GIVE NOTIFICATION |
| P5 | TRAVELING ON TOLL ROAD | (C5) MAINTAIN TARGET EXIT GATE TO BE GENERAL GATE | (C12) GIVE NOTIFICATION FOR INSERTING CARD |
| P6 | VICINITY OF TOLLBOOTH EXIT | (C6) MAINTAIN TARGET EXIT GATE TO BE GENERAL GATE | (C13) GIVE NOTIFICATION FOR INSERTING CARD |
| P7 | RIGHT BEFORE TOLLBOOTH EXIT | (C7) MAINTAIN TARGET EXIT GATE TO BE GENERAL GATE | (C14) STOP AT ETC GATE AND GIVE NOTIFICATION |

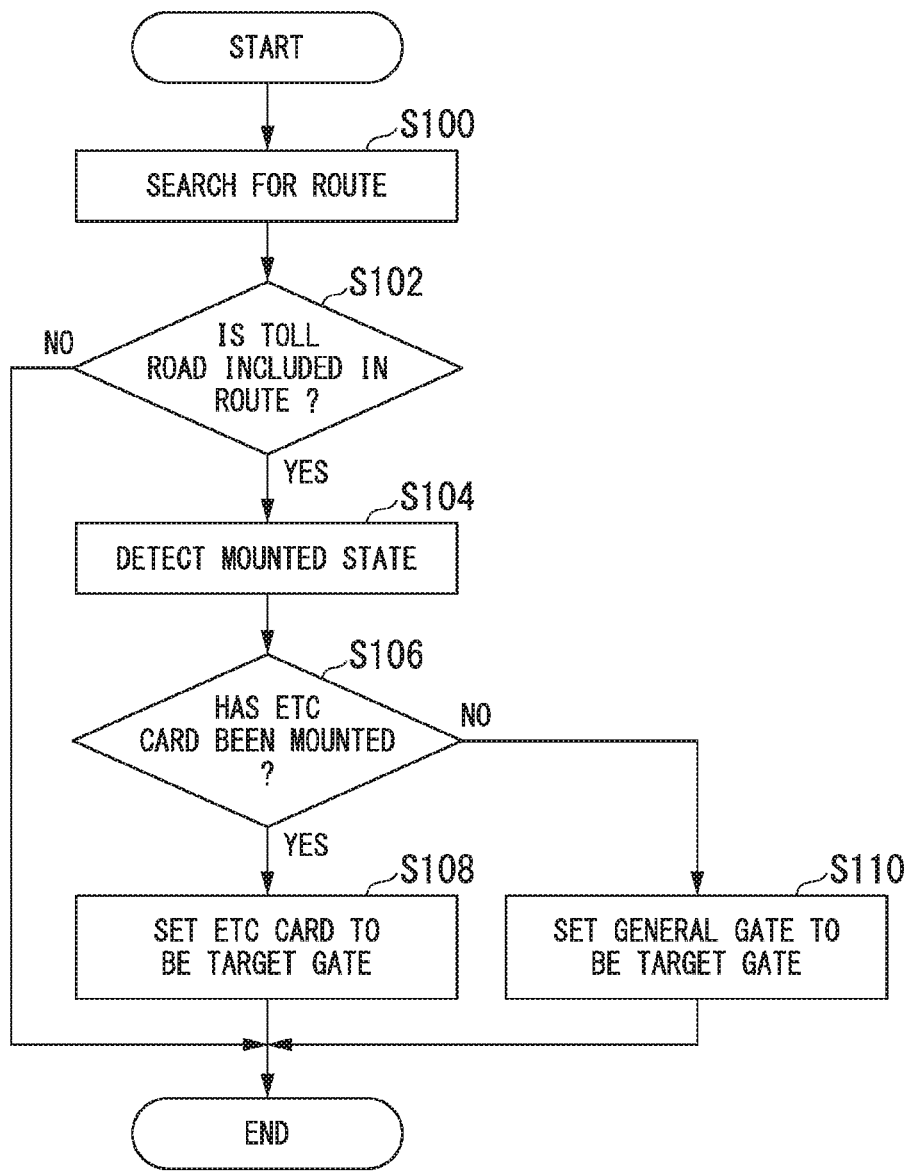

VEHICLE CONTROL DEVICE, VEHICLE CONTROL METHOD, AND VEHICLE CONTROL PROGRAM

TECHNICAL FIELD

The present invention relates to a vehicle control device, a vehicle control method, and a storage medium.

BACKGROUND ART

In the related art, a technique for controlling a vehicle when the vehicle passes through an electronic toll collection system (ETC) lane is known. In relation to this, a technique for notifying that a vehicle is traveling in an ETC lane in a case where the vehicle is not equipped with an ETC card and is traveling in the ETC lane and for stopping the vehicle in a case where the vehicle enters an ETC gate is disclosed (see, for example, Patent Document 1).

CITATION LIST

Patent Document

Patent Document 1

Japanese Unexamined Patent Application, First Publication No. 2005-115531

SUMMARY OF INVENTION

Technical Problem

However, in the technique disclosed in Patent Document 1, a gate through which the vehicle passes cannot be changed in a case where the ETC card is mounted on an on-vehicle device from a state where the ETC card is not mounted on the vehicle or in a case where the ETC card is removed from the on-vehicle device from a state where the ETC card is mounted on the n-vehicle device, and thus there is a possibility that it is not possible to control the traveling of the vehicle according to a change in a mounting state of the ETC card.

The present invention is contrived in consideration of such circumstances, and an object thereof is to provide a vehicle control device, a vehicle control method, and a storage medium which are capable of appropriately controlling the traveling of a vehicle in accordance with a mounting state of a medium such as an ETC card.

Solution to Problem (1): A vehicle control device including a mounting unit on which a medium storing authentication information for passing through a toll road is mountable, a detector which is configured to detect a state where the medium is mounted on the mounting unit or a state where the medium is not mounted on the mounting unit, and an automated driving controller which is configured to perform automated driving and change control details of the automated driving on the basis of detection results obtained by the detector, wherein the automated driving controller configured to determine whether to change a target gate or not on the basis of a relationship between a time when the mounting state detected by the detector is changed and a time when the vehicle is expected to arrive at the target gate or a relationship between a position of the vehicle at the time when the mounting state detected by the detector is changed and a position of the target gate.

(2): The vehicle control device according to (1), change the target gate and change the target track to the target gate in a case where a difference between the time when the mounting state detected by the detector is changed and the time when the vehicle is expected to arrive at the target gate is longer than a predetermined period of time or in a case where a distance between the position of the vehicle at the time when the mounting state detected by the detector is changed and the position of the target gate is longer than a predetermined distance.

(3): The vehicle control device according to (1), the automated driving controller may cause the vehicle to stop at a position in a vicinity of the target gate without changing the target gate in a case where the difference between the time when the mounting state detected by the detector is changed and the time when the vehicle is expected to arrive at the target gate is equal to or less than the predetermined period of time or in a case where the distance between the position of the vehicle at the time when the mounting state detected by the detector is changed and the position of the target gate is equal to or less than the predetermined distance.

(4): The vehicle control device according to (3), the automated driving controller cause a notifier to notify that the vehicle is not able to pass through the target gate in a case where the vehicle is stopped at the position in the vicinity the target gate without changing the target gate.

(5): The vehicle control device according to (4), the automated driving controller may cause the notifier to notify that manual driving is executed before the vehicle is stopped at the position in the vicinity of the target gate without changing the target gate.

A vehicle control method of causing a computer to:

detect a state where a medium storing authentication information for passing through a toll road is mounted on a mounting unit or a state where the medium is not mounted on the mounting unit;

change control details of automated driving on the basis of detection results; and determine whether to change the target gate or not on the basis of a relationship between a time when the detected mounting state is changed and a time when the vehicle is expected to arrive at the target gate or a relationship between a position of the vehicle at the time when the detected mounting state is changed and a position of the target gate.

(7): A vehicle control program for causing a computer to:

detect a state where a medium storing authentication information for passing through a toll road is mounted on a mounting unit or a state where the medium is not mounted on the mounting unit;

change control details of automated driving on the basis of detection results; and determine whether to change the target gate or not on the basis of a relationship between a time when the detected mounting state is changed and a time when the vehicle is expected to arrive at the target gate or a relationship between a position of the vehicle at the time when the detected mounting state is changed and a position of the target gate.

Advantageous Effects of Invention

According to (1), (6), and (7), control details of automated driving are changed on the basis of detection results of a mounting state of a medium, and thus it is possible to appropriately control the traveling of a vehicle in accordance with a mounting state of a medium such as an ETC card.

According to (2) to (3), a target gate is changed on the basis of a change in a mounting state of the medium, and thus it is possible to control the traveling of the vehicle so as to passes through the changed target gate.

According to (5), the invention of the fourth, fifth, or sixth aspect, the target gate is changed on the basis of a relationship between the position of the vehicle when the mounting state of the medium is changed and the position of the gate, and thus it is possible to appropriately control the traveling of the vehicle.

BRIEF DESCRIPTION OF DRAWINGS

FIG. 5 is a diagram showing an example of a relationship between the position of a host vehicle M, the position of an entrance gate of a toll road, and the position of an exit gate thereof.

FIG. 6 is a diagram showing a relationship between the position of the host vehicle M, a traveling state of the host vehicle M, a change in a mounting state, and control details (C1) to (C14).

FIG. 7 is a flowchart showing an example of a flow of processing for setting a gate through which the host vehicle M passes before automated driving is started.

DESCRIPTION OF EMBODIMENTS

Figure 1:
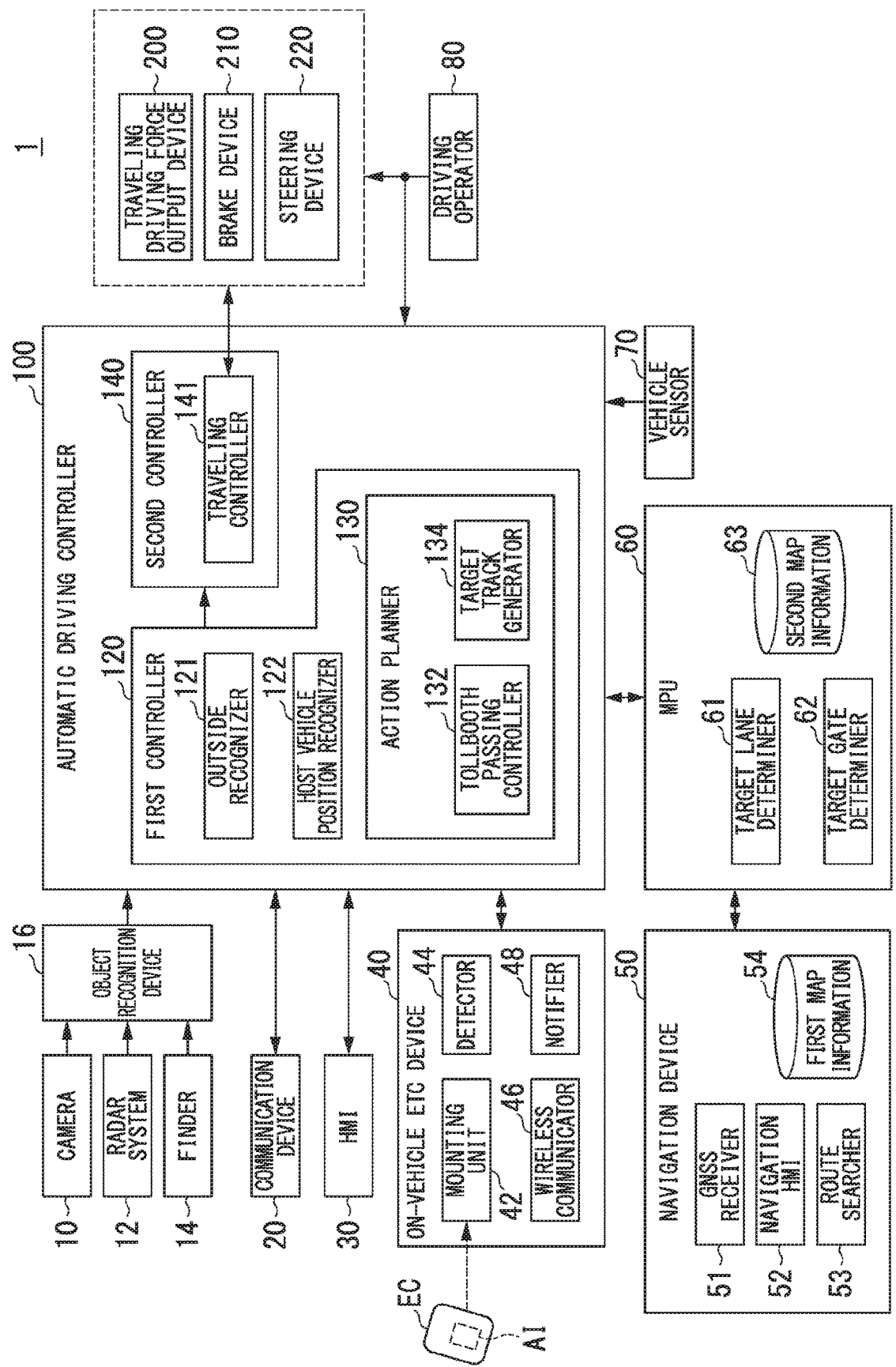
FIG. 1 is a configuration diagram of a vehicle system 1 including an automated driving controller 100.

Hereinafter, embodiments of a vehicle control device, a vehicle control method, and a storage medium of the present invention will be described with reference to the accompanying drawings. FIG. 1 is a configuration diagram of a vehicle system 1 including an automated driving controller 100. A vehicle equipped with the vehicle system 1 is a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor is operated using power generated by a generator connected to an internal combustion engine or discharge power of a secondary battery or a fuel cell.

The vehicle system 1 may include, for example, a camera 10, a radar system 12, a finder 14, an object recognition device 16, a communication device 20, a human machine interface (HMI) 30, an electronic toll collection system (ETC) on-vehicle device 40, a navigation device 50, a micro-processing unit (MPU) 60, a vehicle sensor 70, a driving operator 80, an automated driving controller 100, a traveling driving force output device 200, a brake device 210, and a steering device 220. These devices and apparatuses are connected to each other through a multiple communication line such as a controller area network (CAN) communication line, a serial communication line, a wireless communication network, or the like. Meanwhile, the configuration shown in FIG. 1 is merely an example, and a portion of the configuration may be omitted or another configuration may be further added.

The camera 10 is a digital camera using a solid-state imaging element such as a charge coupled device (CCD) or a complementary metal oxide semiconductor (CMOS). One or a plurality of cameras 10 are installed at any location in the vehicle (hereinafter, referred to as a host vehicle M) on which the vehicle system 1 is mounted. In a case where the front side of the vehicle is imaged, the camera 10 is installed at an upper portion of a front windshield, on the back surface of a room mirror, or the like. For example, the camera 10 periodically and repeatedly images the vicinity of the host vehicle M. The camera 10 may be a stereo camera.

The radar system 12 radiates radio waves such as millimeter waves to the vicinity of the host vehicle M and detects radio waves (reflected waves) reflected by an object to detect at least the position (distance and orientation) of the object. One or a plurality of radar systems 12 are installed at any location in the host vehicle M. The radar system 12 may detect the position and speed of the object by a frequency modulated continuous wave (FM-CW) system.

The finder 14 is a (light detection and ranging or laser imaging detection and ranging (LIDAR) which measures scattered light with respect to irradiation light and detects a distance to an object. One or a plurality of finders 14 are installed at a location in the host vehicle M.

The object recognition device 16 performs sensor fusion processing on detection results obtained by some or all of the camera 10, the radar system 12, and the finder 14 to recognize the position, type, speed, and the like of an object. The object recognition device 16 outputs recognition results to the automated driving controller 100.

The communication device 20 communicates with another vehicle which is present in the vicinity of the host vehicle M by using, for example, a cellular network, a Wi-Fi network, Bluetooth (registered trademark), or dedicated short range communication (DSRC), and communicates with various server devices through a wireless base station such as VICS (registered trademark).

The HMI 30 presents various pieces of information to an occupant of the host vehicle M and receives an input operation performed by the occupant. The HMI 30 includes various display devices, a speaker, a buzzer, a touch panel, switches, keys, and the like. An operation unit such as the touch panel, the switches, or the keys in the HMI 30 functions as a reception unit that receives an operation of switching a driving mode of the host vehicle M to an automated driving mode. The automated driving mode is a driving mode for causing the host vehicle M to automatically travel along a route to a destination, for example, by controlling at least one of steering and an increase or reduction in the speed of the host vehicle M.

The on-vehicle ETC device 40 includes a mounting unit 42 on which an ETC card (EC) is mounted, a detector 44 that detects whether or not an ETC card M is mounted on the mounting unit 42, a wireless communicator 46 that communicates with an ETC roadside unit provided at a gate of a toll road, and a notifier 48. The ETC card is a medium in which authentication information (authentication information (AI)) for making the host vehicle M pass through a toll road is stored. Meanwhile, the wireless communicator 46 and the communication device 20 may be communized.

The mounting unit 42 includes an insertion and removal mechanism into and from which an ETC card is inserted and removed. Either a state where the ETC card is mounted on the mounting unit 42 or a state where the ETC card is removed from the mounting unit 42 is detected by the detector 44. The detector 44 outputs detection results to the automated driving controller 100. Meanwhile, the detector 44 may include a functional unit that detects the validity or invalidity of the ETC card based on the term of validity of the ETC card. In this case, the detector 44 may determine that the ETC card is mounted in a case where the ETC card is valid, and may determine that the ETC card is not mounted in a case where the ETC card is invalid.

The wireless communicator 46 transmits authentication information stored in the ETC card to an on-vehicle ETC device in response to a request received from the ETC roadside unit. The wireless communicator 46 acquires information such as whether or not the vehicle passes through a gate provided with an ETC roadside unit, an entrance tollbooth, and an exit tollbooth on the basis of authentication results received from the ETC roadside unit. The ETC roadside unit determines a charging fee for an occupant of the host vehicle M on the basis of the information received from the on-vehicle ETC device and performs a charging process.

The notifier 48 is a speaker that outputs a sound, an indicator, or the like. The notifier 48 notifies the occupant of a mounting state of the ETC card and the authentication results acquired by the wireless communicator 46.

The navigation device 50 may include, for example, a global navigation satellite system (GNSS) receiver 51, a navigation HMI 52, and a route searcher 53 and stores first map information 54 in a storage device such as a hard disk drive (HDD) or a flash memory. The GNSS receiver 51 specifies the position of the host vehicle M on the basis of a signal received from a GNSS satellite. The position of the host vehicle M is specified or supplemented by an inertial navigation system (INS) using an output of the vehicle sensor 70.

The navigation HMI 52 includes a display device, a speaker, a touch panel, keys, and the like. The navigation HMI 52 and the HMI 30 mentioned above may be partially or entirely integrated. The navigation HMI 52 receives information such as a destination on the basis of an operation of the occupant.

For example, the route searcher 53 determines a route from the position of the host vehicle M which is specified by the GNSS receiver 51 (or any position which is input) to a destination which is input by the occupant by using the navigation HMI 52 with reference to the first map information 54. In a case where the present position of the host vehicle M is away from a searched route by a predetermined distance or more, the route searcher 53 calculates a route again. A route determined by the route searcher 53 is output to the MPU 60. In addition, the navigation device 50 may perform route guiding using the navigation HMI 52 on the basis of the route determined by the route searcher 53.

The first map information 54 may be, for example, information in which the shape of a road is expressed on the basis of a link indicating the road and nodes connected to each other by the link. The first map information 54 may include a curvature of the road, point of interest (POI) information, and the like.

Meanwhile, the navigation device 50 may be realized by a function of a terminal device such as a smartphone or a tablet terminal which is owned by a user. In addition, the navigation device 50 may transmit a present position and a destination to a navigation server through the communication device 20 and may acquire a route transmitted from the navigation server.

The MPU 60 may function as, for example, a target lane determiner 61 and a target gate determiner 62 and stores second map information 63 in a storage device such as an HDD or a flash memory. The target lane determiner 61 divides a route provided from the navigation device 50 into a plurality of blocks (separates the route, for example, for each 100 [m] in a vehicle traveling direction) and determines a target lane for each block with reference to the second map information 63. The target lane determiner 61 performs determination regarding on which lane from the left the vehicle travels. The target lane determiner 61 determines a target lane so that the host vehicle M can travel on a rational travel route for advancing to a divergence destination when there is a divergence point, a junction point, or the like in a route.

The target gate determiner 62 selects any target gate from among a plurality of gates provided in parallel in the route searched by the route searcher 53 on the basis of, for example, a mounting state of the ETC card and other pieces of information. The plurality of gates provided in parallel are a series of gate groups which is built such that the host vehicle M can selectively travel through one gate. The series of gate groups includes an ETC gate for determining whether or not the host vehicle M can pass on the basis of authentication information stored in the ETC card, a general gate for permitting the passing of the host vehicle M under conditions of ticket reception or manual payment, and an ETC/general gate having functions of both an ETC gate and a general gate. In a case where an ETC card is mounted on the mounting unit 42, the target gate determiner 62 selects an ETC gate, in principle. In a case where an ETC card is not mounted on the mounting unit 42, the target gate determiner 62 selects a general gate, in principle. The target gate determiner 62 may select an ETC/general gate in a case where there is a closed gate or on the basis of the presence of another vehicle, or the like. Further, in a case where there are a plurality of target gates selected on the basis of authentication information, the target gate determiner 62 determines one target gate on the basis of a route to a destination, the presence of another vehicle, whether or not the vehicle has changed a lane, or the like.

The second map information 63 is map information which is more accurate than the first map information 54 in the navigation device 50. The second map information 63 may include, for example, information on the center of a lane, information on a boundary between lanes, and the like. In addition, the second map information 63 may include road information, traffic control information, address information (address/postal code), facility information, telephone number information, and the like. The road information includes information indicating the types of roads such as expressways, toll roads, national roads, and prefectural roads and information such as the number of lanes on roads, the width of each lane, gradients of roads, locations of roads (three-dimensional coordinates including a longitude, a latitude, and a height), curvatures of curves of lanes, locations of junction and divergence points of lanes, and signs provided on roads. The second map information 63 includes type information indicating which type among an ETC gate, a general gate, and an ETC/general gate a gate in a toll road is, and the position of each gate. The second map information 63 may be updated at any time by accessing another device using the communication device 20.

The vehicle sensor 70 includes a vehicle speed sensor that detects the speed of the host vehicle M, an acceleration sensor that detects an acceleration, a yaw rate sensor that detects an angular velocity around a vertical axis, a direction sensor that determines the direction of the host vehicle M, and the like.

The driving operator 80 may include, for example, an accelerator pedal, a brake pedal, a shift lever, a steering wheel, and other operators. A sensor that detects an operation amount or whether or not an operation has been performed is installed at the driving operator 80, and detection results thereof are output to either one or both of the automated driving controller 100 and all of the traveling driving force output device 200, the brake device 210, and the steering device 220.

The automated driving controller 100 may include, for example, a first controller 120 and a second controller 140. Each of the first controller 120 and the second controller 140 is realized by a processor such as a central processing unit (CPU) executing a program (software). In addition, some or all of functional units of the first controller 120 and the second controller 140 which are to be described below may be realized by hardware such as a large scale integration (LSI), an application specific integrated circuit (ASIC), or a field-programmable gate array (FPGA) or may be realized by cooperation of software and hardware.

The first controller 120 may include, for example, an outside recognizer 121, a host vehicle position recognizer 122, and an action planner 130.

The outside recognizer 121 recognizes a position and states such as the speed, and acceleration of the surrounding vehicle on the basis of pieces of information which are input from the camera 10, the radar system 12, and the finder 14 through the object recognition device 16. The position of the surrounding vehicle may be represented by a representative point such as the centroid or corner of the surrounding vehicle, or may be represented by a region expressed by the contour of the surrounding vehicle. The "states" of the surrounding vehicle may include the acceleration or jerk of the surrounding vehicle or an "action state" (for example, whether or not the surrounding vehicle is changing a lane or is attempting to change a lane). In addition, the outside recognizer 121 may recognize positions of a guardrail, an electric pole, a parked vehicle, a pedestrian, and other objects in addition to the surrounding vehicle.

The host vehicle position recognizer 122 may recognize, for example, a lane (traveling lane) in which the host vehicle M is traveling and a relative position and posture of the host vehicle M with respect to the traveling lane. The host vehicle position recognizer 122 recognizes the traveling lane by comparing patterns of road section lines (for example, arrangement of solid lines and dashed lines) obtained from the second map information 63 with patterns of road section lines in the vicinity of the host vehicle M which are recognized from an image captured by the camera 10. In this recognition, the position of the host vehicle M which is acquired from the navigation device 50 and processing results obtained by an inertial navigation system (INS) may be added.

Figure 2:
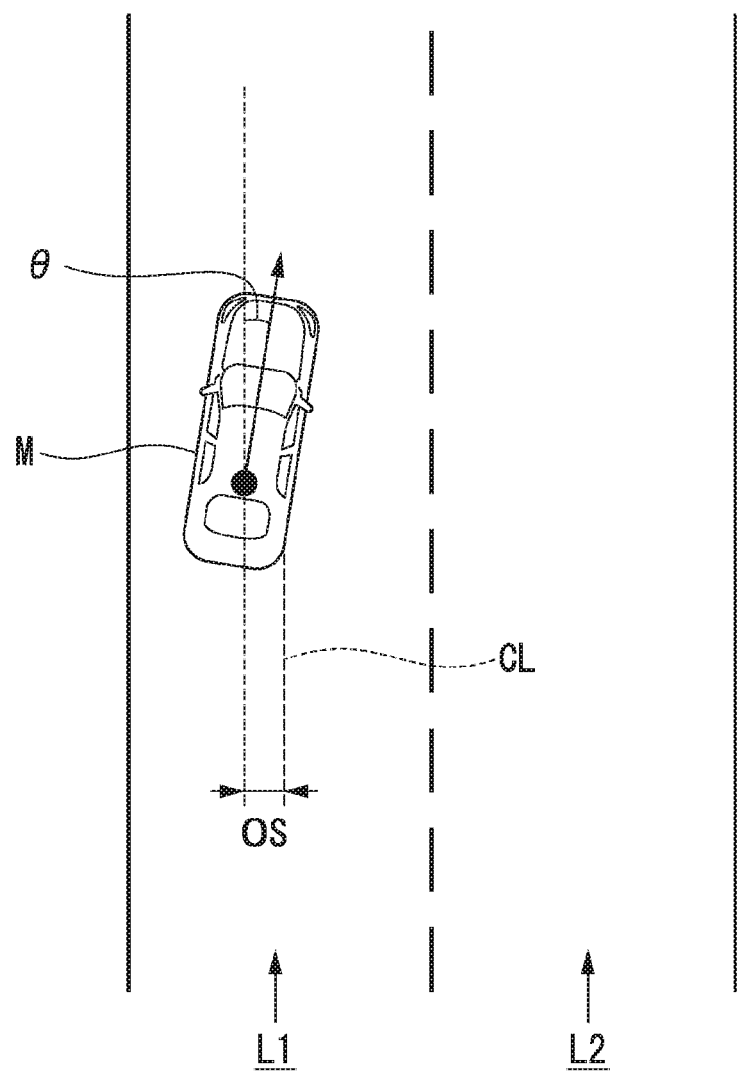
FIG. 2 is a diagram showing a state where a relative position and posture of a host vehicle M with respect to a traveling lane L1 are recognized by a host vehicle position recognizer 122.

The host vehicle position recognizer 122 may recognize, for example, the position and posture of the host vehicle M with respect to the traveling lane. FIG. 2 is a diagram showing a state where a relative position and posture of the host vehicle M with respect to a traveling lane L1 are recognized by the host vehicle position recognizer 122. The host vehicle position recognizer 122 may recognize, for example, a deviation OS of a reference point (for example, the centroid) of the host vehicle M from a traveling lane center CL and an angle $\theta$ with respect to a line connected to the traveling lane center CL in the traveling direction of the host vehicle M as the relative position and posture of the host vehicle M with respect to the traveling lane L1, respectively. Meanwhile, alternatively, the host vehicle position recognizer 122 may recognize the position of a reference point of the host vehicle M with respect to any side end of the host lane L1, or the like as the relative position of the host vehicle M with respect to the traveling lane. The relative position of the host vehicle M which is recognized by the host vehicle position recognizer 122 is provided to the target lane determiner 61 and the action planner 130.

The action planner 130 includes a tollbooth passing controller 132 and a target track generator 134. The action planner 130 is configured to determine events to be sequentially executed in automated driving so that the host vehicle travels on the target lane determined by the target lane determiner 61 and can cope with surrounding conditions of the host vehicle M. The events may include, for example, a fixed speed traveling event in which a vehicle travels on the same traveling lane at a fixed speed, a follow-up traveling event in which a vehicle follows a preceding vehicle, a lane changing event, a joining event, a divergence event, a tollbooth passing event, an urgent stop event, a handover event for terminating automated driving and switching to manual driving, and the like. In addition, an action for avoidance may be planned on the basis of the surrounding conditions (the presence of a surrounding vehicle and a pedestrian, lane narrowing due to road construction, or the like) of the host vehicle M during the execution of these events. The tollbooth passing controller 132 causes the host vehicle to travel on the target lane determined by the target lane determiner 61 and through the target gate determined by the target gate determiner 62 in a tollbooth passing event.

The target track generator 134 generates a target track on which the host vehicle M will travel in the future. The target track is expressed as a track in which points (track points) at which the host vehicle M is supposed to arrive are arranged in order. The track point is a point at which the host vehicle M is supposed to arrive for each predetermined traveling distance. Apart from this, a target speed and a target acceleration for each predetermined sampling period (for example, approximately 0 comma several [sec]) are generated as portions of the target track. In addition, the track point may be a position at which the host vehicle M is supposed to arrive at the sampling time for each predetermined sampling period. In this case, information on the target speed and the target acceleration is expressed by an interval between the track points.

Figure 3:
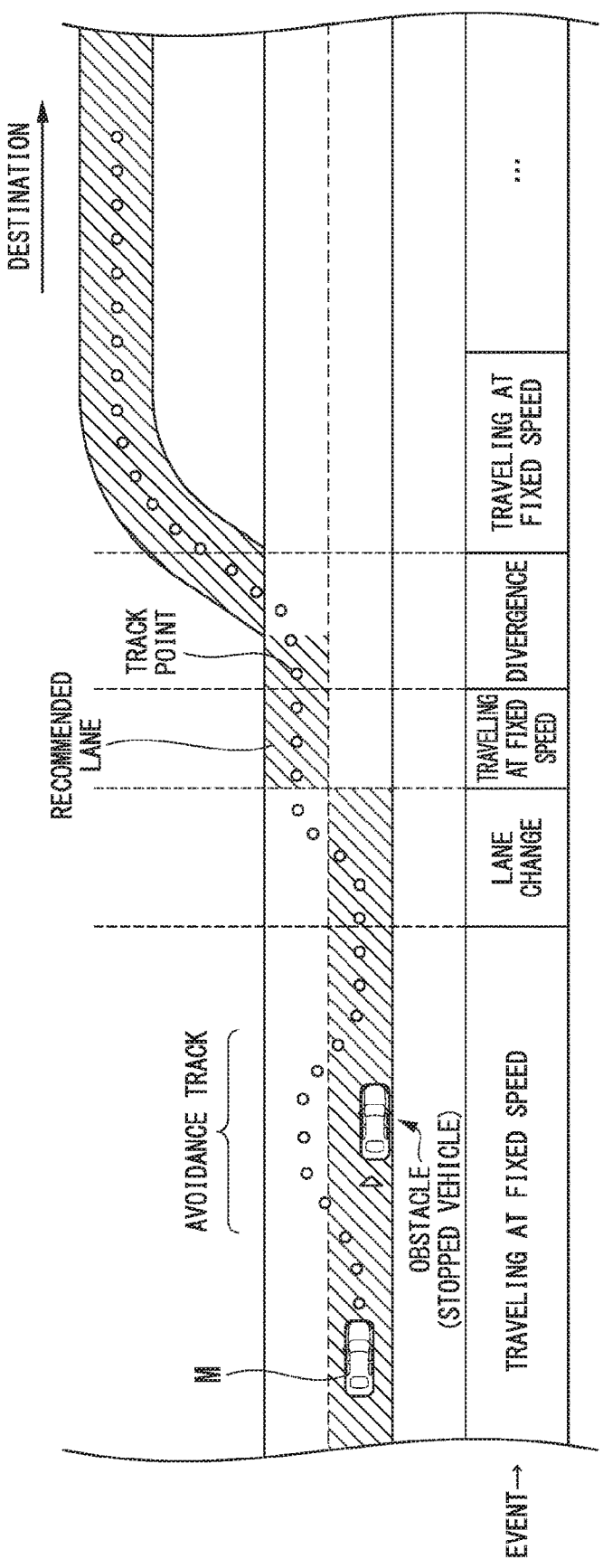
FIG. 3 is a diagram showing a state where a target track is generated on the basis of a target lane.

FIG. 3 is a diagram showing a state where a target track is generated on the basis of a target lane. As shown in the drawing, the target lane is set such that it is convenient for the host vehicle to travel along a route to a destination. The action planner 130 starts a lane change event, a divergence event, a joining event, a tollbooth passing event, or the like when the host vehicle comes within a predetermined distance in front of a changeover point of the target lane (which may be determined according to the type of event). In a case where it is necessary to avoid an obstacle during the execution of each event, an avoidance track is generated as shown in the drawing. For example, the target track generator 134 generates a plurality of candidates for the target track and selects an optimum target track at the point in time on the basis of safety and efficiency. In this manner, an automated driving mode is used to cause the host vehicle M to travel along a route to a destination.

The second controller 140 includes a traveling controller 141. The traveling controller 141 controls the traveling driving force output device 200, the brake device 210, and the steering device 220 so that the host vehicle M passes through the target track generated by the action planner 130 at a scheduled time.

The traveling driving force output device 200 outputs a traveling driving force (torque) for making a vehicle to travel to a driving wheel. The traveling driving force output device 200 includes a combination of, for example, an internal combustion engine, an electric motor, a transmission, and the like and an ECU controlling these components. The ECU controls the above-described components in accordance with information which is input from the traveling controller 141 or information which is input from the driving operator 80.

The brake device 210 may include, for example, a brake caliper, a cylinder that transmits hydraulic pressure to the brake caliper, an electric motor that generates hydraulic pressure in the cylinder, and a brake ECU. The brake ECU controls the electric motor in accordance with information which is input from the traveling controller 141 and causes a brake torque based on a control operation to be output to each wheel. The brake device 210 may include, as a backup, a mechanism transmitting hydraulic pressure generated by operating the brake pedal included in the driving operator 80 to the cylinder through a master cylinder. Meanwhile, the brake device 210 is not limited to the above-described components, and may be an electronically controlled hydraulic pressure brake device that controls an actuator in accordance with information which is input from the traveling controller 141 so as to transmit hydraulic pressure of the master cylinder to the cylinder.

The steering device 220 may include, for example, a steering ECU and an electric motor. For example, the electric motor may apply a force to a rack-and-pinion mechanism to change the direction of steered wheels. The steering ECU drives the electric motor in accordance with information which is input from the traveling controller 141 or information which is input from the driving operator 80 to change the direction of the steered wheels.

Figure 4:
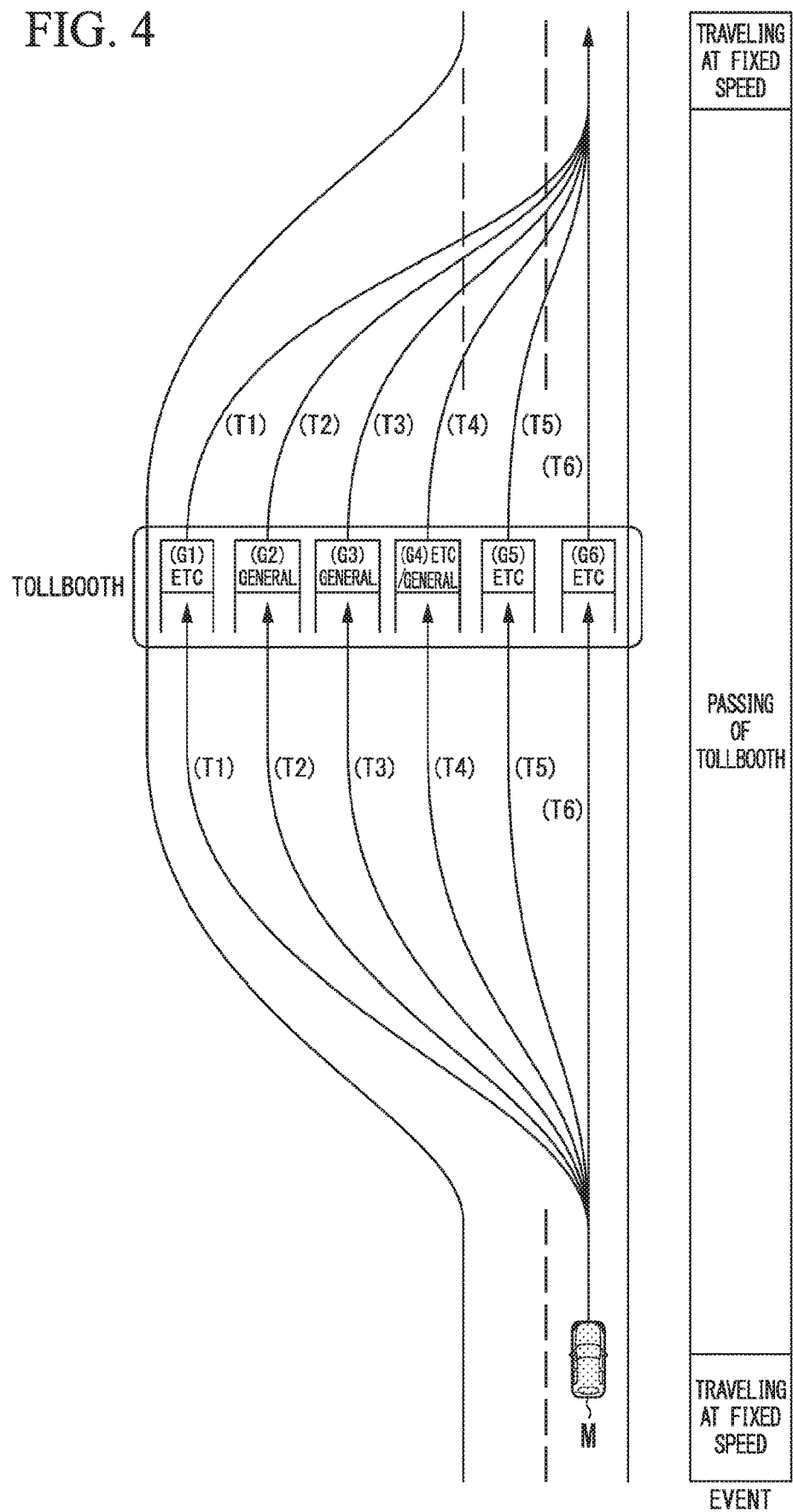
FIG. 4 is a diagram showing a state where a target track is generated in a tollbooth passing event.

Hereinafter, a tollbooth passing event will be described. FIG. 4 is a diagram showing a state where a target track is generated in the tollbooth passing event. The action planner 130 starts the tollbooth passing event when the host vehicle comes within a predetermined distance in front of a tollbooth. The target track generator 134 generates a target track for passing through a target gate determined by the target gate determiner 62 from a target lane determined by the target lane determiner 61. The target track generator 134 generates target tracks (T1), (T5), and (T6) when ETC gates (G1), (G5), and (G6) are selected as candidates for the target gate. The tollbooth passing controller 132 determines an optimum target track among the target tracks (T1), (T5), and (T6) on the basis of viewpoints of safety due to the presence of other vehicles and the like and efficiency of a travel distance and the like. The target track generator 134 generates target tracks (T2) and (T3) in a case where general gates (G2) and (G3) are selected as candidates for the target gate. The tollbooth passing controller 132 determines an appropriate target track out of the target tracks (T2) and (T3) on the basis of viewpoints of safety due to the presence of other vehicles and the like and efficiency of a travel distance and the like.

Hereinafter, control of the traveling of the host vehicle M in a case where a mounting state of an ETC card is changed will be described. FIG. 5 is a diagram showing an example of a relationship between the position of the host vehicle M, the position of an entrance gate of a toll road, and the position of an exit gate thereof. FIG. 6 is a diagram showing a relationship between the position of the host vehicle M, a traveling state of the host vehicle M, a change in a mounting state, and control details (C1) to (C14).

First, control in a case where the ETC card has been changed from a non-mounted state to a mounted state will be described. In a case where the ETC card has been changed from a non-mounted state to a mounted state before the host vehicle M departs from a departure point P1, the target gate determiner 62 changes a target gate from a general gate to an ETC gate (C1). When the ETC card has been changed from a non-mounted state to a mounted state in a case where the host vehicle M is traveling on a general road to a toll road, the target gate determiner 62 changes a target gate from a general gate to an ETC gate (C2). Meanwhile, in a case where the position of the host vehicle M is separated from the vicinity of the departure point P1 or an entrance position Pi of a tollbooth by more than a predetermined distance (D1+D2), no influence is exerted on a target track, and thus a target lane is not changed.

In a case where the ETC card has been changed from a non-mounted state to a mounted state when the position of the host vehicle M is in the vicinity of the tollbooth entrance (from P3 to P4), the target gate determiner 62 changes a target gate from a general gate to an ETC gate, and the target lane determiner 61 changes a traveling lane of the host vehicle M on the basis of the position of the changed target gate (C3). For example, in FIG. 4, in a case where the target gate has been changed from a general gate (G3) to an ETC gate (G6), the target lane determiner 61 changes a target lane from a left lane close to the general gate (G3) to a right lane close to the ETC gate (G6). The target track generator 134 changes a target track on the basis of the changed target lane. The wording "the position of the host vehicle M is in the vicinity of the tollbooth" means that a distance between the position of the host vehicle M and the tollbooth is within a prescribed distance (D1+D2, a first predetermined distance) and the lane of the host vehicle M can be changed. The wording "the position of the host vehicle M is in the vicinity of the tollbooth" can be rephrased with the wording "a period of time between a time when the mounting state of the ETC card is changed and a time when the host vehicle M is expected to arrive at the target gate is a period of time in which the lane of the host vehicle M can be changed."

In a case where the ETC card has been changed from a non-mounted state to a mounted state when the position of the host vehicle M is right in front of the tollbooth entrance (from P4 to Pi), the target gate determiner 62 does not change the target gate from a general gate to an ETC gate. The tollbooth passing controller 132 causes the host vehicle M to travel to a general gate without change and causes the host vehicle M to stop at the general gate (C4). The wording "the position of the host vehicle M is right in front of the tollbooth" means that a distance between the position of the host vehicle M and the tollbooth is equal to or less than a predetermined distance (D2, a second predetermined distance) and is a distance in which the lane of the host vehicle M cannot be changed. In addition, the wording "the position of the host vehicle M is right in front of the tollbooth" can be rephrased with the wording "a period of time between a time when the mounting state of the ETC card is changed and a time when the host vehicle M is expected to arrive at the target gate is a period of time in which the lane of the host vehicle M cannot be changed." (is equal to or less than a predetermined period of time). A position at which the host vehicle M stops at a general gate may be, for example, a position where an occupant can perform a toll payment operation with a worker at the general gate. In addition, the tollbooth passing controller 132 notifies that it is not possible to pass through the general gate through automated driving by using the HMI 30 (C4). Meanwhile, the present invention is not limited to the HMI 30, and the tollbooth passing controller 132 may give a notification using either the notifier 48 or the navigation HMI 52 or may give a notification using at least one of the HMI 30, the notifier 48, and the navigation HMI 52.

In a case where the ETC card has been changed from a non-mounted state to a mounted state when the host vehicle M is traveling on the toll road (P5) from the entrance (Pi) of the toll road to the vicinity (P6) of the tollbooth, the target gate determiner 62 maintains the target gate as a general gate (C5). In a case where the ETC card has been changed from a non-mounted state to a mounted state when the position of the host vehicle M is in the vicinity of the tollbooth exit (from P6 to P7), the target gate determiner 62 maintains the target gate as a general gate as it is (C6). In a case where the ETC card has been changed from a non-mounted state to a mounted state when the position of the host vehicle M is right in front of the tollbooth exit (from P7 to Po), the target gate determiner 62 maintains the target gate as a general gate as it is (C5).

Next, control in a case where the ETC card has been changed from a mounted state to a non-mounted state will be described. In a case where the ETC card has been changed from a mounted state to a non-mounted state before the position of the host vehicle M departs from the departure point P1, the target gate determiner 62 changes a target gate from an ETC gate to a general gate (C8). In a case where the ETC card has been changed from a mounted state to a non-mounted state when the host vehicle M is traveling on a general road to a toll road, the target gate determiner 62 changes a target gate from an ETC gate to a general gate (C9).

In a case where the ETC card has been changed from a mounted state to a non-mounted state when the position of the host vehicle M is in the vicinity of the tollbooth entrance (from P3 to P4), the target gate determiner 62 changes a target gate from an ETC gate to a general gate, and the target lane determiner 61 changes a traveling lane of the host vehicle M on the basis of the position of the changed target gate (C10). For example, in FIG. 4, in a case where the target gate has been changed from an ETC gate (G6) to a general gate (G3), the target lane determiner 61 changes a target lane from a right lane close to the ETC gate (G6) to a left lane close to the general gate (G3). The target track generator 134 changes a target track on the basis of the changed target lane.

In a case where the ETC card has been changed from a mounted state to a non-mounted state when the position of the host vehicle M is right in front of the tollbooth entrance (from P4 to Pi), the target gate determiner 62 does not change the target gate from an ETC gate to a general gate. The tollbooth passing controller 132 causes the host vehicle M to travel to an ETC gate without change and causes the host vehicle M to stop at the ETC gate (C11). In addition, the tollbooth passing controller 132 notifies that it is not possible to pass through the ETC gate by using the HMI 30 (C11).

In a case where the ETC card has been changed from a mounted state to a non-mounted state when the host vehicle M is traveling on the toll road (P5) from the entrance (Pi) of the toll road to the vicinity (P6) of the tollbooth, the tollbooth passing controller 132 gives a notification to insert the ETC card into the mounting unit 42 (C12). In a case where the ETC card has been changed from a mounted state to a non-mounted state when the position of the host vehicle M is in the vicinity of the tollbooth exit (from P6 to P7), the tollbooth passing controller 132 gives a notification to insert the ETC card into the mounting unit 42 (C13). In a case where the ETC card has been changed from a mounted state to a non-mounted state when the position of the host vehicle M is right in front of the tollbooth exit (from P7 to Po), the tollbooth passing controller 132 causes the host vehicle M to travel to an ETC gate and causes the host vehicle M to stop at the ETC card (C14). In addition, the tollbooth passing controller 132 notifies that it is not possible to pass through the ETC gate through automated driving by using the HMI 30 (C14).

Meanwhile, as described above, the vehicle system 1 changes a target gate on the basis of a mounting state of an ETC card. However, the present invention is not limited thereto, and the vehicle system 1 may change control details of automated driving on the basis of detection results of a mounting state of the ETC card. The vehicle system 1 may control the speed of the host vehicle M on the basis of the detection results of the mounting state of the ETC card. For example, in a case where the ETC card has been changed from a state where the ETC card is mounted on the mounting unit 42 to a state where the ETC card is not mounted on the mounting unit 42, the vehicle system 1 may notify that the ETC card is not mounted and may reduce the speed of the host vehicle M in order to make time for mounting the ETC card again.

Hereinafter, a flow of an operation of changing a gate through which the host vehicle M passes on the basis of a mounting state of an ETC card will be described. FIG. 7 is a flowchart showing an example of a flow of processing for setting a gate through which the host vehicle M passes before automated driving is started. First, the navigation device 50 searches for a route to a destination (step S100). Next, the tollbooth passing controller 132 determines whether or not a toll road is included in the searched route (step S102). In a case where a toll road is not included in the route, the tollbooth passing controller 132 terminates the processing of the present flowchart without setting a target gate.

In a case where a toll road is included in the route, the tollbooth passing controller 132 detects a mounting state of an ETC card by using the detector 44 (step S104). The tollbooth passing controller 132 determines whether or not an ETC card is mounted on the mounting unit 42 (step S106). In a case where an ETC card is mounted on the mounting unit 42, the target gate determiner 62 sets a target gate at a tollbooth entrance and a target gate at a tollbooth exit to be an ETC gate (step S108). In a case where an ETC card is not mounted on the mounting unit 42, the target gate determiner 62 sets a target gate at a tollbooth entrance and a target gate at a tollbooth exit to be a general gate (step S110).

Figure 8:
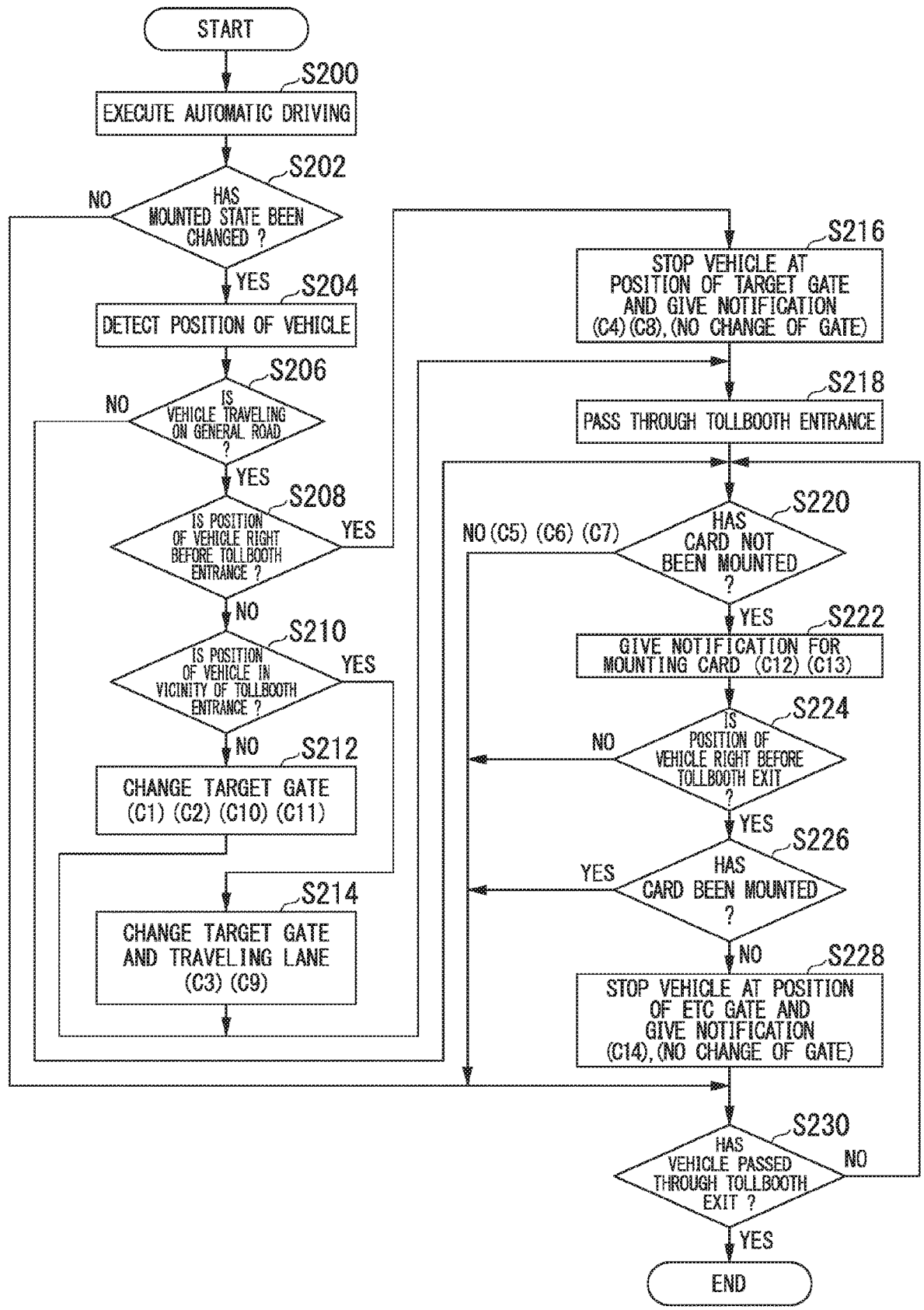
FIG. 8 is a flowchart showing an example of a flow of control in a case where a mounting state of an ETC card has been changed in the middle of the execution of automated driving.

FIG. 8 is a flowchart showing an example of a flow of control in a case where a mounting state of an ETC card has been changed in the middle of the execution of automated driving. Meanwhile, it is assumed that processing to be described with reference to FIG. 8 is started in a state where a target gate is set by executing the processing in FIG. 7. The tollbooth passing controller 132 determines whether or not a mounting state of the ETC card has been changed (step S202) in the middle of the execution of automated driving by the host vehicle M along a route (step S200). The tollbooth passing controller 132 causes the processing to proceed to step S230 in a case where a mounting state of the ETC card has not been changed.

In a case where a mounting state of the ETC card has been changed, the tollbooth passing controller 132 detects the position of the host vehicle M (step S204). Next, the tollbooth passing controller 132 determines whether or not the host vehicle M is traveling on a general road (step S206). In a case where the host vehicle M is traveling on a toll road, the tollbooth passing controller 132 causes the processing to proceed to step S220.

In a case where the host vehicle M is traveling on a general road, the tollbooth passing controller 132 determines whether or not the position of the host vehicle M is right in front of a tollbooth entrance (step S208). In a case where the position of the host vehicle M is right in front of the tollbooth entrance, the tollbooth passing controller 132 causes the host vehicle M to stop at the position of the target gate and gives a notification without changing the target gate (step S216). The process of step S216 is equivalent to the control details (C4) or (C8). In a case where the position of the host vehicle M is not right in front of the tollbooth entrance, the tollbooth passing controller 132 determines whether or not the position of the host vehicle M is in the vicinity of the tollbooth entrance (step S210). In a case where the position of the host vehicle M is in the vicinity of the tollbooth entrance, the target gate determiner 62 changes the target gate on the basis of the changed mounting state, and the target lane determiner 61 changes a traveling lane on the basis of the position of the changed target gate (step S214). The process of step S216 is equivalent to control details (C3) or (C9). In a case where the position of the host vehicle M is not in the vicinity of the tollbooth entrance, the target gate determiner 62 changes the target gate on the basis of the changed mounting state (step S212). The process of step S216 is equivalent to control details (C1), (C2), (C10) or (C11). Thereafter, the host vehicle M passes through the target gate (step S218).

Next, the tollbooth passing controller 132 determines whether or not a mounting state of the ETC card has been changed to a non-mounted state in the middle of the traveling of the host vehicle M on a toll road (step S220). In a case where the change in the mounting state of the ETC card is a change from a non-mounted state to a mounted state, the tollbooth passing controller 132 causes the processing to proceed to step S230. That is, even when the ETC card is mounted on the on-vehicle ETC device 40 in the middle of the traveling of the host vehicle M on the toll road, the target gate determiner 62 maintains the target gate as a general gate as it is. This processing is equivalent to control details (C5), (C6), or (C7).

In a case where the ETC card has been changed to a non-mounted state, the tollbooth passing controller 132 gives a notification to mount the ETC card on the on-vehicle ETC device 40 (step S222). Next, the tollbooth passing controller 132 determines whether or not the position of the host vehicle M is right in front of the tollbooth exit (step S224). In a case where the position of the host vehicle M is not right in front of the tollbooth exit, the processing proceeds to step S230. In a case where the position of the host vehicle M is right in front of the tollbooth exit, the tollbooth passing controller 132 determines whether or not the ETC card has been mounted on the mounting unit 42 (step S226). In a case where the ETC card has been mounted on the mounting unit 42, the tollbooth passing controller 132 causes the processing to proceed to step S230. That is, the tollbooth passing controller 132 continues automated driving in order to pass through the target gate. In a case where the ETC card has not been mounted on the mounting unit 42, the tollbooth passing controller 132 gives a notification to cause the host vehicle M to stop at the position of an ETC gate (step S228). The process of step S216 is equivalent to control details (C14).

Next, the tollbooth passing controller 132 determines whether or not the host vehicle has passed through an exit of a toll road (step S230). In a case where the host vehicle has not passed through a tollbooth exit, the tollbooth passing controller 132 repeats the process of step S220 and the subsequent processes. In a case where the host vehicle has passed through the tollbooth exit, the tollbooth passing controller 132 terminates the processing of the present flowchart.

Meanwhile, in a case where an ETC card has not been mounted for a predetermined period of time (except for a case where the host vehicle arrives right in front of a tollbooth exit) after it is determined in step S220 that the ETC card has been changed to a non-mounted state and a notification to mount the ETC card on the on-vehicle ETC device 40 is given in step S222 among the processes described in the flowchart of FIG. 8, automated driving may be continued after changing a target gate to a general gate. This is because it is possible to enter an ETC gate and exit from a general gate. Thus, it is possible to inhibit unintentional stopping of the host vehicle M.

In addition, after it is determined in step S220 that the ETC card has been changed to a non-mounted state and a notification to mount the ETC card on the on-vehicle ETC device 40 is given in step S222 among the processes described in the flowchart of FIG. 8, automated driving may be continued after changing a target gate to a general gate at a timing slightly before it is determined in step S224 that "the position of the host vehicle M is right in front of the tollbooth exit" (a predetermined period of time before or a predetermined distance in front). Thus, as described above, it is possible to inhibit unintentional stopping of the host vehicle M.

In addition, the process of step S220 and the subsequent processes among the processes described in the flowchart of FIG. 8 may be omitted in a case where the host vehicle M enters from a general gate (including a case where the host vehicle enters from an ETC/general gate without using an ETC card). That is, in a case where the host vehicle enters a toll road without using an ETC card, a general gate may be maintained as a target gate regardless of a mounting state of the ETC card. This is because the host vehicle cannot exit from the ETC gate in this case.

Figure 9:
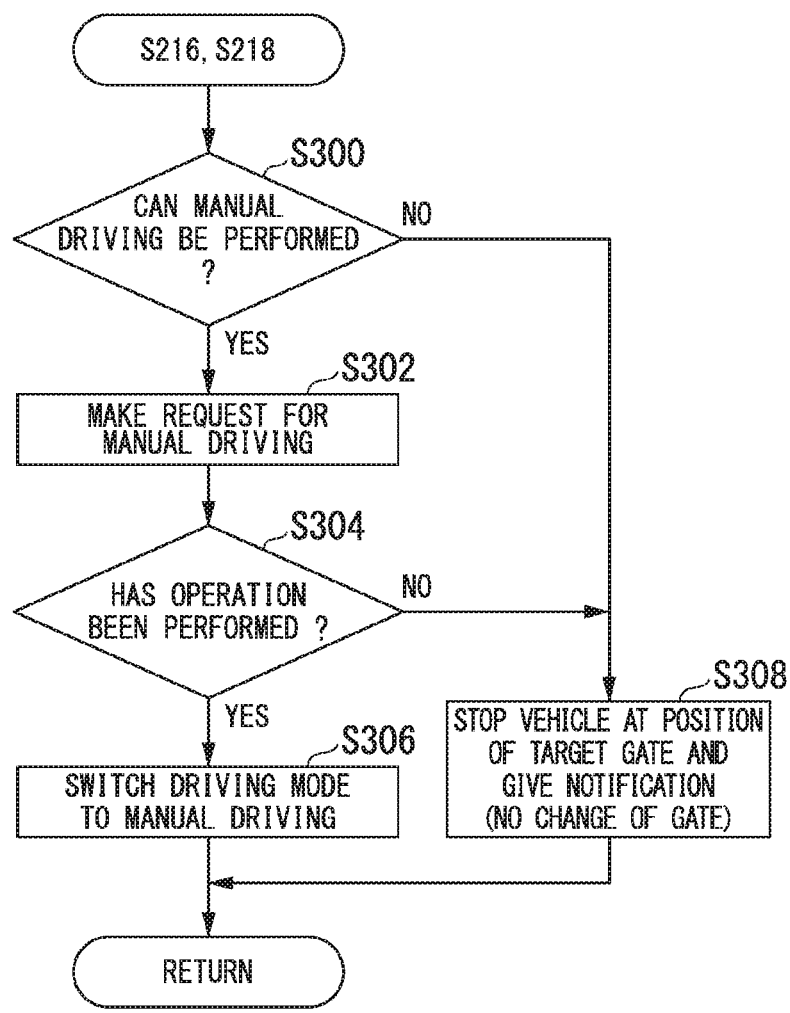
FIG. 9 is a flowchart showing an example of a flow of another processing in a case where a mounting state of an ETC card has been changed right in front of a tollbooth.

In the processing described in the flowchart of FIG. 8, it is assumed that the tollbooth passing controller 132 causes the host vehicle M to stop at the position of the target gate (S216, S228) in a case where a mounting state of the ETC card has been changed right in front of the tollbooth. However, the host vehicle may be switched from automated driving to manual driving in this processing (S216, S228). FIG. 9 is a flowchart showing an example of a flow of other processing in a case where a mounting state of an ETC card has been changed right in front of a tollbooth.

Figure 10:
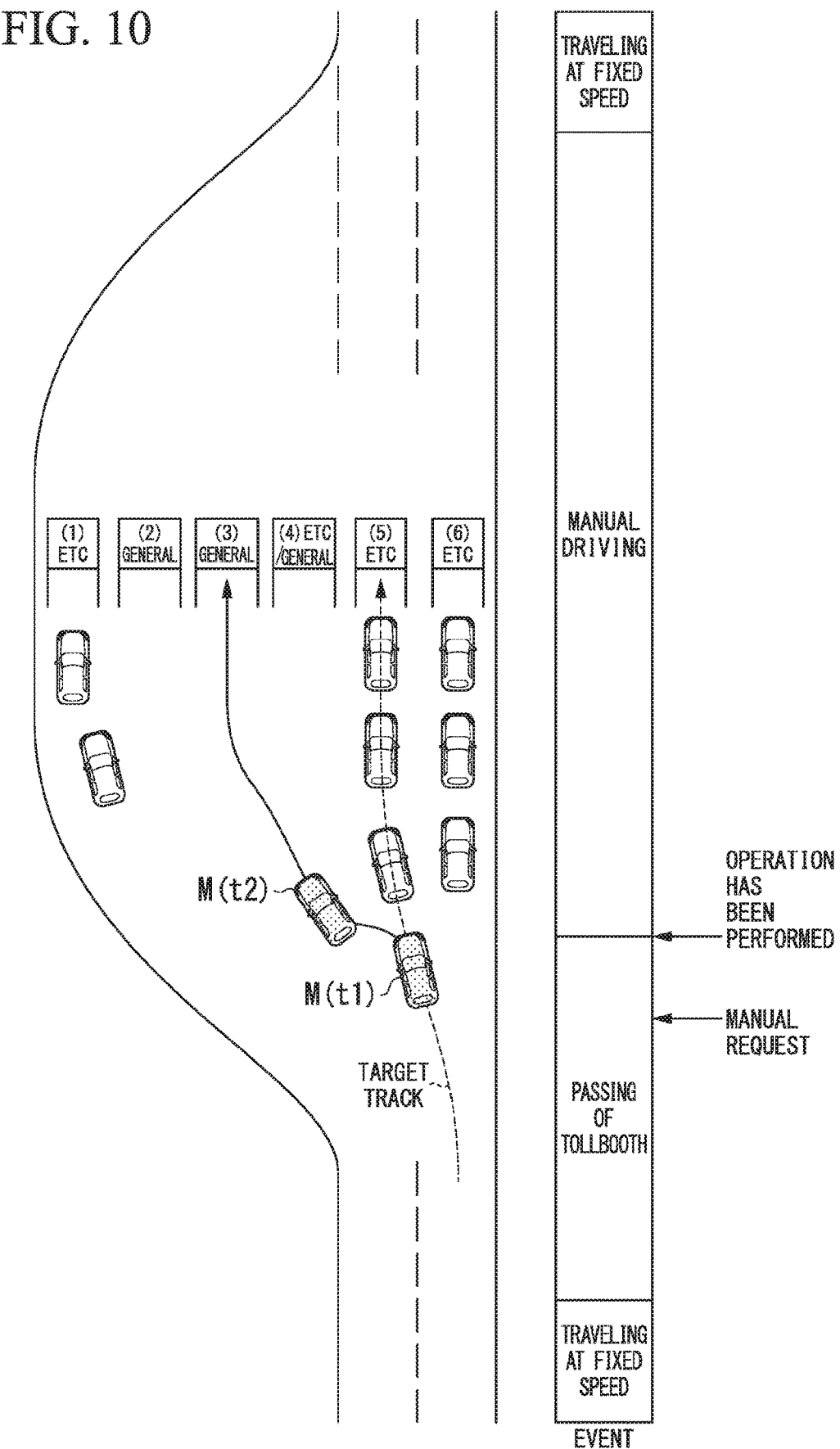
FIG. 10 is a diagram showing an example of a situation where manual driving can be executed.

The tollbooth passing controller 132 determines whether or not manual driving can be performed right in front of the tollbooth (step S300). The tollbooth passing controller 132 determines whether or not the host vehicle M can travel to a gate desired by an occupant by the occupant's manual driving, for example, on the basis of a distance from the host vehicle M to the gate and the speed of the host vehicle M. FIG. 10 is a diagram showing an example of a situation where manual driving can be executed. It is assumed that an ETC card is removed right in front of a tollbooth in a case where a target gate of the host vehicle M is the ETC gate (G5). In a case where the speed of the host vehicle M is low because the host vehicle M (t1) is traveling while following a plurality of other vehicles at time t1, the tollbooth passing controller 132 determines that it is possible to cause the host vehicle M to travel to a general gate (G3) by executing manual driving.

In a case where it is not possible to perform manual driving, the tollbooth passing controller 132 causes the host vehicle M to stop at the position of the target gate and gives a notification (step S308). In a case where it is possible to perform manual driving, the tollbooth passing controller 132 makes a request for starting manual driving (step S302). The tollbooth passing controller 132 determines whether or not an operation of the driving operator 80 has been performed (step S304). In a case where an operation of the driving operator 80 has not been performed, the tollbooth passing controller 132 causes the host vehicle M to stop at the position of the target gate and gives a notification (step S308). In a case where an operation of the driving operator 80 has been performed, the tollbooth passing controller 132 terminates automated driving and switches a driving mode from automated driving to manual driving (step S306).

As described above, the vehicle system 1 changes control details of automated driving in a case where a mounting state of an ETC card has been changed, and thus it is possible to appropriately control the traveling of the host vehicle M in accordance with the mounting state of the ETC card. Specifically, the vehicle system 1 determines whether to change a target gate or not, and thus it is possible to change the target gate in accordance with a change in the mounting state of the ETC card.

In addition, according to the vehicle system 1, it is possible to determine whether to change a target gate or not on the basis of a relationship between a time when a mounting state of an ETC card is changed and a time when the host vehicle M is expected to arrive at the target gate. In addition, according to the vehicle system 1, it is possible to determine whether to change a target gate or not on the basis of a relationship between the position of the host vehicle M at the time when the mounting state of the ETC card has been changed and the position of the target gate. According to the vehicle system 1, in a case where a distance between the position of the host vehicle M at the time when the mounting state of the ETC card has been changed and the position of the target gate is longer than a predetermined distance, the target gate is changed and a target track to the target gate is changed, and thus it is possible to more appropriately control the traveling of the host vehicle M in accordance with the mounting state of the ETC card.

According to the vehicle system 1, in a case where a distance between the position of the host vehicle M at a time when a mounting state of an ETC card is changed and the position of a target gate is shorter than a predetermined distance, the host vehicle M is stopped at a position in the vicinity of the target gate without changing the target gate, and thus it is possible to avoid a change in the target gate in a situation where it is difficult to change a lane. In addition, according to the vehicle system 1, in a case where the host vehicle M is stopped at a position in the vicinity of the target gate, it is notified that the host vehicle cannot pass through the target gate, and thus it is possible to inhibit a sense of discomfort given to an occupant due to the stop of the host vehicle M. Further, according to the vehicle system 1, it is notified that manual driving is executed before the host vehicle M is stopped at a position in the vicinity of the target gate, and thus it is possible to improve convenience for an occupant who desires to change a gate through which the host vehicle M passes.

While a mode for implementing the present invention has been described above using an embodiment, the present invention is not limited to the embodiment, and various modifications and replacements can be made without departing from the scope of the present invention.

What is claimed is:

1. A vehicle control device comprising:
a mounting unit on which a medium storing authentication information for passing through a toll road is mountable;
a detector configured to detect a state where the medium is mounted on the mounting unit or a state where the medium is not mounted on the mounting unit; and
an automated driving controller configured to perform automated driving and change control details of the automated driving on the basis of detection results obtained by the detector,
wherein the automated driving controller configured to determine whether to change a target gate or not on the basis of a relationship between a time when the mounting state detected by the detector is changed and a time when the vehicle is expected to arrive at the target gate or a relationship between a position of the vehicle at the time when the mounting state detected by the detector is changed and a position of the target gate.

2. The vehicle control device according to claim 1,
wherein the automated driving controller is configured to change the target gate and change the target track to the target gate in a case where a difference between the time when the mounting state detected by the detector is changed and the time when the vehicle is expected to arrive at the target gate is longer than a predetermined period of time or in a case where a distance between the position of the vehicle at the time when the mounting state detected by the detector is changed and the position of the target gate is longer than a predetermined distance.

3. The vehicle control device according to claim 1, wherein
the automated driving controller is configured to cause the vehicle to stop at a position in a vicinity of the target gate without changing the target gate in a case where the difference between the time when the mounting state detected by the detector is changed and the time when the vehicle is expected to arrive at the target gate is equal to or less than the predetermined period of time or in a case where the distance between the position of the vehicle at the time when the mounting state detected by the detector is changed and the position of the target gate is equal to or less than the predetermined distance.

4. The vehicle control device according to claim 3, wherein
the automated driving controller is configured to cause a notifier to notify that the vehicle is not able to pass through the target gate in a case where the vehicle is stopped at the position in the vicinity of the target gate without changing the target gate.

5. The vehicle control device according to claim 3, wherein the automated driving controller is configured to cause the notifier to notify that manual driving is executed before the vehicle is stopped at the position in the vicinity of the target gate without changing the target gate.

6. A vehicle control method of causing a computer to:

detect a state where a medium storing authentication information for passing through a toll road is mounted on a mounting unit or a state where the medium is not mounted on the mounting unit;

change control details of automated driving on the basis of detection results; and determine whether to change the target gate or not on the basis of a relationship between a time when the detected mounting state is changed and a time when the vehicle is expected to arrive at the target gate or a relationship between a position of the vehicle at the time when the detected mounting state is changed and a position of the target gate.

7. A non-transitory computer storage medium storing a vehicle control program for causing a computer to:

detect a state where a medium storing authentication information for passing through a toll road is mounted on a mounting unit or a state where the medium is not mounted on the mounting unit;

change control details of automated driving on the basis of detection results; and determine whether to change the target gate or not on the basis of a relationship between a time when the detected mounting state is changed and a time when the vehicle is expected to arrive at the target gate or a relationship between a position of the vehicle at the time when the detected mounting state is changed and a position of the target gate.

* * * * *